(12) United States Patent
L'Abee et al.

(10) Patent No.: US 11,158,903 B2
(45) Date of Patent: Oct. 26, 2021

(54) SEPARATORS, ARTICLES AND METHODS OF MAKING THEREOF

(71) Applicant: SABIC GLOBAL TECHNOLOGIES B.V., Bergen op Zoom (NL)

(72) Inventors: Roy Martinus Adrianus L'Abee, Veldhoven (NL); Fabien Darosa, Dordrecht (NL)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 163 days.

(21) Appl. No.: 16/323,716

(22) PCT Filed: Aug. 3, 2017

(86) PCT No.: PCT/IB2017/054769
§ 371 (c)(1),
(2) Date: Feb. 6, 2019

(87) PCT Pub. No.: WO2018/029580
PCT Pub. Date: Feb. 15, 2018

(65) Prior Publication Data
US 2019/0181413 A1   Jun. 13, 2019

Related U.S. Application Data

(60) Provisional application No. 62/372,996, filed on Aug. 10, 2016.

(51) Int. Cl.
| | |
|---|---|
| *H01M 2/16* | (2006.01) |
| *H01M 50/411* | (2021.01) |
| *H01M 10/0525* | (2010.01) |
| *H01M 50/403* | (2021.01) |
| *B01D 69/12* | (2006.01) |
| *B01D 71/68* | (2006.01) |
| *B01D 69/02* | (2006.01) |

(Continued)

(52) U.S. Cl.
CPC ........... *H01M 50/411* (2021.01); *B01D 69/02* (2013.01); *B01D 69/12* (2013.01); *B01D 71/64* (2013.01);
(Continued)

(58) Field of Classification Search
CPC .. H01M 8/0202; H01M 8/0269; B01D 69/02; B01D 69/12; B01D 71/64; B01D 71/68; C08F 220/52
See application file for complete search history.

(56) References Cited

U.S. PATENT DOCUMENTS

| | | | | |
|---|---|---|---|---|
| 10,363,546 B2 * | 7/2019 | Song | .................. | B01J 20/28035 |
| 2007/0060688 A1 * | 3/2007 | Wang | .................. | H01M 8/103 |
| | | | | 524/323 |

(Continued)

FOREIGN PATENT DOCUMENTS

| | | | | |
|---|---|---|---|---|
| EP | 3493297 A1 * | 6/2019 | .......... | H01M 2/1666 |
| WO | 2014020545 | 2/2014 | | |

OTHER PUBLICATIONS

International Search Report for International Application No. PCT/IB2017/054769; International Filing Date: Aug. 3, 201; dated Oct. 10, 2017; 6 pages.

(Continued)

*Primary Examiner* — Amanda C. Walke
(74) *Attorney, Agent, or Firm* — Cantor Colburn LLP

(57) ABSTRACT

A separator (104) includes a porous polyetherimide membrane comprising a plurality of pores, wherein at least a portion of the pores comprise an electrolyte composition comprising an ionic liquid.

19 Claims, 2 Drawing Sheets

(51) Int. Cl.
  *B01D 71/64* (2006.01)
  *H01M 10/0568* (2010.01)
  *H01M 10/0569* (2010.01)

(52) U.S. Cl.
  CPC ........ *B01D 71/68* (2013.01); *H01M 10/0525* (2013.01); *H01M 50/403* (2021.01); *H01M 10/0568* (2013.01); *H01M 10/0569* (2013.01); *H01M 2300/0028* (2013.01)

(56) References Cited

U.S. PATENT DOCUMENTS

| | | | |
|---|---|---|---|
| 2011/0033743 A1* | 2/2011 | Lee | H01M 2/166 429/145 |
| 2013/0244094 A1 | 9/2013 | Giroud et al. | |
| 2014/0030608 A1 | 1/2014 | L'Abee et al. | |
| 2014/0167329 A1 | 6/2014 | L'Abee et al. | |
| 2017/0263908 A1* | 9/2017 | Laicer | H01M 2/1653 |
| 2019/0036094 A1* | 1/2019 | Yamato | H01M 10/0525 |

OTHER PUBLICATIONS

Kirchhoffer et al., "Separators for Li-ion and Li-Metal Battery including Ionic Liquid Based Electrolytes Based on the TFSI- and FSI-Anions", International Journal of Science, 2014, 15, 14868-1890; doi:10.3390/ijrns150814868.

Written Opinion of the International Searching Authority for International Application No. PCT/IB2017/054769; International Filing Date: Aug. 3, 201; dated Oct. 10, 2017; 5 pages.

* cited by examiner

FSI = bis(fluorosulfonyl)imide  TFSI = bis(trifluoromethanesulfonyl)imide

PYR13 = N-Propyl-N-methylpyrrolidinium  PYR14 = N-Butyl-N-methylpyrrolidinium  BMI = 1-Butyl-3-methylimidazolium

SEPARATORS, ARTICLES AND METHODS OF MAKING THEREOF

CROSS-REFERENCE TO RELATED APPLICATIONS

This application is a National Stage application of PCT/IB2017/054769, filed Aug. 3, 2017, which claims the benefit of U.S. Provisional Application No. 62/372,996, filed Aug. 10, 2016 both of which are incorporated by reference herein in their entirety.

BACKGROUND

Battery cells typically include a positive and negative electrode (cathode and anode) and a liquid electrolyte solution, separated by a thin, porous film known as a separator. The main function of the separator is to keep the two electrodes physically apart from each other in order to prevent an electrical short circuit. Accordingly, the separator should be electrically insulating. At the same time, the separator should allow rapid transport of ionic charge carriers that are needed to complete the circuit during cell charging and discharging. The separator should have the capability of conducting ions by either intrinsic ionic conduction (such as solid electrolytes) or by soaking the separator with a liquid electrolyte.

Current commercially available Li-ion batteries typically use electrolytes based on alkyl carbonate solvents in which a Li salt is dissolved, for example, ethylene carbonate/dimethyl carbonate (EC/DMC) with 1M lithium hexafluorophosphate ($LiPF_6$)). Typical separators for these batteries are porous separator films based on polyethylene (PE) and/or polypropylene (PP). A significant drawback of such systems is the high flammability of the alkyl carbonate solvents, and the possibility of electrochemical instability at high voltage. New electrolyte systems for Li-ion batteries are being developed including ionic liquids. Advantageously, ionic liquids are inflammable and have excellent high voltage electrochemical stability (>5V). Traditional polyolefin-based porous separators are chemically stable in ionic liquids, meaning that they do not dissolve nor significantly swell. However, these polyolefin-based porous separators are highly incompatible with the ionic liquids in terms of polarity, leading to poor wetting of the separator by the electrolyte. Insufficient wetting of the separator with the ionic liquid leads to manufacturing challenges, as extended vacuum and/or temperature cycles over extended time periods are often required to fill the separator pores with the ionic liquid. Additionally, incompletely wetted pores will lead to inferior battery performance, as non-wetted pores deteriorate ion conduction through the separator.

In most reports on ionic liquids for Li-ion or Li-metal batteries, glass fiber (GF) separators are used, while their thickness of approximately 300 μm, versus approximately 25 μm for commercial separators, is not adapted for commercial applications. Coating of polyolefin membranes with ceramics or surfactants is likely to improve wettability, but potentially only at the surface (so not the core of the separator), and it adds secondary processing steps. Membranes highly filled with ceramic particles (e.g., Separion®, which is a PET nonwoven impregnated with $SiO_2$ and/or $Al_2O_3$ nanoparticles) are expected to have an improved wetting with ionic liquids too, but at the expense of a high basis weight and low mechanical strength.

Accordingly, there remains a continuing need in the art for improved battery separators with improved wettability to ionic liquids, as well as batteries including ionic liquids and compatible separators.

BRIEF DESCRIPTION

In an aspect, a separator 104, comprises a porous polyetherimide membrane comprising a plurality of pores, wherein at least a portion of the pores comprise an electrolyte composition comprising an ionic liquid.

In another aspect, a method of preparing the above-described separator 104 comprises dissolving a polyetherimide in a solvent at room temperature to 210° C., preferably 30-200° C., to form a solution, casting the solution at a temperature of 20-50° C., preferably 20-30° C. to form a thin film, coagulating the thin film in a coagulating bath comprising a nonsolvent for the polyetherimide, preferably water, and optionally a solvent for the polyetherimide to provide the porous polyetherimide membrane, and contacting the porous polyetherimide membrane with the electrolyte composition to fill at least a portion of the plurality of pores to provide the separator.

In an aspect, a system comprises an anode 102, a cathode 100, the above-described separator 104 disposed between the anode 102 and the cathode 100, and the electrolyte comprising the ionic liquid 108 in contact with the anode 102, the cathode 100, and the separator 104.

BRIEF DESCRIPTION OF THE DRAWINGS

The following figures are exemplary embodiments wherein the like elements are numbered alike.

DETAILED DESCRIPTION

The present disclosure is related to porous polyetherimide-based membranes for use as separators that demonstrate an outstanding wetting performance with various ionic liquids, while retaining their chemical compatibility (e.g., substantially no dissolution in the ionic liquids). Unexpectedly, it was found that in contrast to traditional electrolytes as described in U.S. Publication No. 2014/0030608, when ionic liquids are employed, polyetherimides exhibit substantially no dissolution. Surprisingly, both standard polyetherimide membranes (e.g., polyetherimides based on bisphenol A (BPA) and 1,3-diamino-phenylene (mPD)) and chemically resistant polyetherimide membranes (e.g., polyetherimides based on BPA and 1,4-diaminophenylene (pPD)) exhibit substantially no dissolution.

Figures 1, 2:
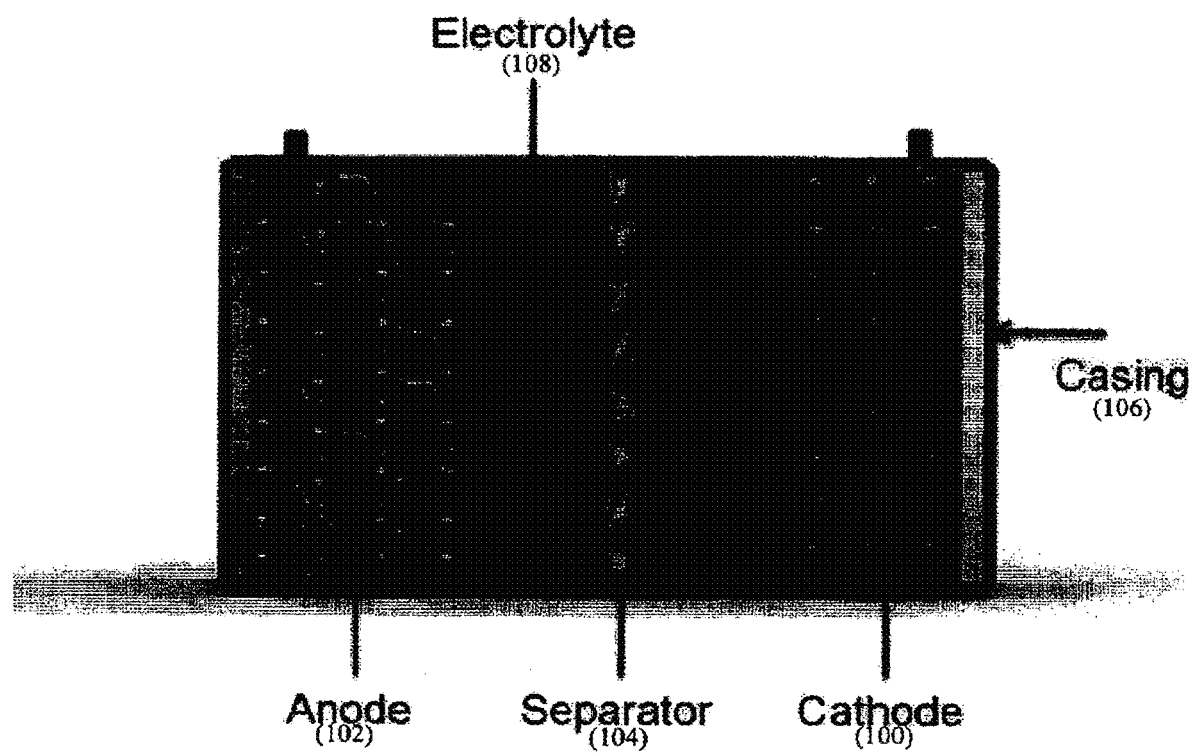
FIG. 1 illustrates an exemplary system, e.g., a battery.
FIG. 2 shows exemplary ionic liquids.

FIG. 1 illustrates an exemplary system, e.g., a battery. In an aspect, the battery comprises a positive electrode 100 (cathode), a negative electrode 102 (anode), and a separator 104 disposed between the positive electrode 100 and the negative electrode 102. As an example, one or more of the positive electrode 100, the negative electrode 102, and the separator 104 is received in a battery vessel or casing 106. As a further example, an electrolyte composition comprising an ionic liquid 108 is disposed in the casing 106 (e.g., adjacent one or more of the positive electrode 100, the negative electrode 102, and the separator 104, soaking the separator 104, immersing the separator 104, filling the pores of the separator, and the like).

In an aspect, a separator 104 comprises a porous polyetherimide membrane comprising a plurality of pores, wherein at least a portion of the pores comprise an electrolyte composition comprising an ionic liquid.

In an aspect, the separator 104 can be prepared by dissolving a polyetherimide in a solvent for the polyetherimide (e.g., a pyrrolidone solvent, a phenolic solvent, dimethylformamide, dimethylacetamide or a combination comprising at least one of the foregoing) at room temperature or elevated temperatures (e.g., 20-210° C.), followed by casting the solution at reduced temperature (e.g., 20-50° C., preferably 20-30° C.) to form a thin film, and coagulating the thin film in a bath comprising a non-solvent for the polyetherimide, preferably water, and optionally a solvent for the polyetherimide to provide the porous membrane. The separator is then formed by contacting the porous membrane with the electrolyte composition to fill at least a portion of the plurality of pores.

In an aspect, the separator 104 can be prepared by dissolving a polyetherimide in N-methyl-2-pyrrolidone (NMP) at room temperature or elevated temperatures (140-202° C.) in a closed system (i.e., no direct contact between the solution and the air atmosphere) or open system, followed by casting at reduced temperature (20-140° C.) and coagulating in water or a mixture of water and a solvent for the polyetherimide.

Exemplary pyrrolidone-based solvents include one or more of 2-pyrrolidone, 1-ethyl-2-pyrrolidone, 1-cyclohexyl-2-pyrrolidone, 1-(2-hydroxyethyl)-2-pyrrolidone, 1-octyl-2-pyrrolidone, 1-N-ethoxycarbonyl-3-pyrrolidone, N-methyl-2-pyrrolidone, and 1-vinyl-2-pyrrolidone.

Exemplary phenolic solvents include one or more of 4-chloro-3-methyl-phenol, 4-chloro-2-methyl-phenol, 2,4-dichloro-6-methyl-phenol, 2,4-dichloro-phenol, 2,6-dichloro-phenol, 4-chloro-phenol, 2-chloro-phenol, o-cresol, m-cresol, p-cresol, 4-methoxy-phenol, catechol, benzoquinone, 2,3-xylenol, 2,6-xylenol, and resorcinol.

In an aspect, the polymer solution can comprise inorganic particles such as magnesium oxide particles, titanium oxide particles, and the like.

In an aspect, the separator 104 has one or more of the following properties: an ionic liquid contact angle of less than or equal to 50°, preferably less than or equal to 30°; a thickness of about 5 micrometers to about 200 micrometers, preferably about 10 micrometers to about 30 micrometers; a basis weight of 2 to 40 g/m$^2$, preferably 5 to 15 g/m$^2$; a porosity of 10% to 90%, preferably 35% to 60%; an average pore size of 2 nm to 2000 nm, preferably 10 nm to 200 nm; a Gurley air permeability of 10 to 1000 s/100 cc, preferably 20 to 500 s/100 cc; a dimensional stability of >120° C., preferably >180° C.; or a normalized dry weight of greater than or equal to 90% after 7 days at 55° C. in the ionic liquid.

Contact angle can be measured according to a standard procedure (e.g., via the Young equation or similar), where a mathematical expression is fitted to the shape of the drop and the slope of the tangent to the drop at the liquid-solid-vapor (LSV) interface line is calculated. Basis weight is calculated from the dimensions of the sample, such as its length, width and thickness, and the weight of the sample. Porosity is calculated from the thickness, basis weight and polymer density. Average pore size is determined by Capillary Force Porometry (CFP). Gurley air permeability is measured by Gurley densitometer, JIB 8117 (2009)—Determination of air permeance and air resistance (medium large)—Gurley Method. Dimensional stability is measured by Dynamic Mechanical Analysis (DMA) with a film tension setup in controlled force mode, according to NASA/™-2010-216099. Normalized dry weight is determined by placing 3-5 mg ("initial mass") of separator in the ionic liquid at 55° C. After 7 days, the separators were taken out of the ionic liquids and were dried at 60° C. The dried separators were soaked in ethanol to dissolve any potential residual ionic liquid, and were subsequently dried again, and weighed ("dried mass"). The weight of the original separator and the separator sample after the above procedure was compared, and the "normalized dry weight" was calculated as 100%* (("dried mass"−"initial mass")/("initial mass")).

In an aspect, the electrolyte composition comprises an ionic liquid and optionally a lithium salt. Ionic liquids are formed by the combination of cations and anions and are in the liquid state at temperatures close to ambient temperature, such as at temperatures below 100° C.

In an aspect, the cation of the ionic liquid is an imidazolium cation, an isoquinolinium cation, a sulfonium cation, an ammonium cation, a pyridinium cation, a phosphonium cation, a pyrrazolium cation, a pyrrolidinium cation, a piperidinium cation, a dicationic species, or a combination comprising at least one of the foregoing. Exemplary imidazolium cations include, but are not limited to, ethyl-3-methylimidazolium cation, 1-butyl-3-methylimidazolium cation, 1,2-dimethyl-3-propylimidazolium cation, 1,2-diethyl-3,4-dimethylimidazolium cation, 1-methyl-3-alkylimidazolium cation, 1,2-dimethyl-3-butylimidazolium cation, 1-cyanomethyl-3-methylimidazolium cation, 1-cyanopropyl-3-methylimidazolium cation, and the like. Exemplary pyridinium cations include, but are not limited to, N-butyl-4-methylpyridinium cation, N-methyl-N-propylpyridinium cation, N-butylpyridinium, cation, tetraalkylammonium cations, N,N,-diethyl-N-methyl-N-(2-methoxyethyl)ammonium cation, trimethylhexylammonium cation, N-cyanomethyl-N,N,N-trimethylammonium cation, N-cyanoethyl-N,N,N-trimethylammonium cation, trimethylpropylammonium cation, N-methyl-N,N-diethyl-N-(methoxyethylene)ammonium cation, tetraamylammonium cation, and the like. Exemplary pyrrazolium cations include, but are not limited to, N,N,-diethyl-3-methylpyrazolium cation. Exemplary pyrrolidinium cations include, but are not limited to N-methoxyethyl-N-methylpyrrolidinium, N-propyl-N-methylpyrrolidinium cation, N-butyl-N-ethylpyrrolidinium cation, 1-butyl-1-methylpyrrolidinium cation, 1-butyl-3-methylpyrrolidinium cation, and the like. Exemplary piperidinium cations include, but are not limited to, N-methyl-N-propylpiperidinium cation, N-butyl-N-methylpiperidinium cation, and the like. Exemplary dicationic, species include, but are not limited to, 1-(3-methylimidazolium-1-alkyl(trimethylammonium) cation, and the like.

In an aspect, the anion of the ionic liquid is bis(fluorosulfonyl)imide, bis(trifluoromethane)sulfonimide, bis(pentafluoroethylsulfonyl)amide, (fluorosulfonyl)(trifluoromethylsulfonyl)amide, tetrafluoroborate anion, hexafluorophosphate anion, bis(fluorosulfonyl)imide anion, bis(perfluoroethylsulfonyl)imide anion, bis(trifluoromethanesulfonyl)imide anion, triflate anion, tetrachloroaluminate anion, 2,2,2-trifluoro-N-(trifluoromethylsulfonyl)acetamide, aluminum chloride ($AlCl_4^-$), $Cl^-$, $F^-$, $S^{2-}$, and the like, and a combination comprising at least one of the foregoing.

In an aspect, the ionic liquid further comprises a dissolved salt. Exemplary cations for the dissolved salt include $Li^+$, $Mg^{2+}$, $Ca^{2+}$, $Al^{3+}$, $Zn^{2+}$, $Y^{3+}$, tetra ($C_{1-8}$)alkyl ammonium, and a combination comprising at least one of the foregoing.

For example, in the case of a lithium ion battery cell, the ionic liquid electrolyte can be prepared by the following method: a lithium salt (0.1-3M) is dispersed in an ionic liquid of PP13 (N-methyl-N-propylpiperidinium) or (N-methyl-N-propylpyridinium) cation with the ionic liquid and lithium salt containing a (bis(trifluoromethanesulfonyl)imide) or $BF_4^-$ anion.

In an aspect, the lithium salt comprises lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), lithium 2-trifluoromethyl-4,5-dicyanoimidazole (LiTDI), lithium 4,5-dicyano-1,2,3-triazolate (LiDCTA), Li-fluoroalkyl-phosphates ($LiPF_3(CF_2CF_3)_3$), lithium bisperfluoro-ethysulfonylimide (LiBETI), lithium bis(trifluoromethanesulphonyl)imide or lithium trifluoromethanesulfonimide (LiTFSI), lithium bis(fluorosulphonyl)imide (LiFSI), an ionic liquid lithium salt, or a combination comprising at least one of the foregoing.

In an aspect, the positive electrode 100 can comprise a positive active material incorporated therein and may further contain an electrically conductive material such as carbon and/or a binder for helping sheet or pelletize the positive active material. The positive electrode 100 can be used in contact with an electronically conductive substrate such as a metal as a collector. As an example, the binder can be formed from a polytetrafluoroethylene (PTFE), a polyvinylidene fluoride (PVdF), an ethylene-propylene-diene copolymer, a styrene-butadiene rubber or the like. In an aspect, the collector can be formed from a foil, thin sheet, mesh, or gauze of metal such as aluminum, stainless steel, and titanium. In another aspect, the positive active material and/or the conductive material can be pelletized or sheeted with the aforementioned binder by kneading/rolling. Alternatively, these materials can be dissolved and suspended in a solvent such as toluene and N-methylpyrrolidone (NMP) to form a slurry which is then spread over the aforementioned collector and dried to form a sheet. Other materials and forming processes can be used.

In an aspect, the positive electrode 100 can comprise a lithium composite oxide containing at least one of iron, cobalt, manganese and nickel incorporated therein as a positive active material and is capable of insertion/releasing lithium ion. Various oxides such as a chalcogen compound, e.g., lithium-containing iron composite oxide, lithium-containing cobalt composite oxide, lithium-containing nickel-cobalt composite oxide, lithium-containing nickel composite oxide and lithium-manganese composite oxide may be used as positive active material. Other materials and forming processes can be used.

In an aspect, negative electrode 102 can comprise a negative active material incorporated therein. As an example, the negative electrode 102 can be formed by pelletizing, tabulating, or sheeting the negative active material with a conductive material, a binder, etc. In an aspect, the conductive material can be formed from an electronically conducting material such as carbon or metal. As an example, the binder can be formed from polytetrafluoroethylene, polyvinylidene fluoride, styrene-butadiene rubber, carboxymethyl cellulose or the like. As another example, the collector can be formed from a foil, thin plate, mesh, or gauze of copper, stainless steel, nickel or the like. As a further example, the negative active material and/or the conductive material can be pelletized or sheeted with the aforementioned binder by kneading/rolling. Alternatively, these materials can be dissolved and suspended in a solvent such as water and N-methylpyrrolidone to form slurry which is then spread over the aforementioned collector and dried to obtain a sheet. Other materials and forming processes can be used.

In an aspect, the negative electrode 102 is capable of containing lithium (or lithium ion) or capable of occluding/releasing lithium (or lithium ion) similarly to the aforementioned positive electrode. As an example, the negative electrode 102 can comprise a negative active material incorporated therein capable of containing lithium ion or insertion/releasing lithium ion at a more negative potential than that of the positive electrode 100 combined with the negative electrode 102. Examples of negative active materials having such characteristics include lithium metal; carbonaceous materials (carbon-based materials) such as artificial graphite, natural graphite, non-graphitizable carbon, and graphitizable carbon; graphene; carbon nanotubes; lithium titanate; iron sulfide; cobalt oxide; lithium-aluminum alloy; silicon; and tin oxide. Other materials and forming processes can be used.

The polyetherimides can comprise polyetherimide homopolymers and polyetherimides copolymers (e.g., polyetherimidesulfones). The polyetherimide can be selected from (i) polyetherimide homopolymers, e.g., polyetherimides, (ii) polyetherimide co-polymers, and (iii) combinations thereof. Polyetherimides are known polymers and are sold by SABIC under the ULTEM, EXTEM, and SILTEM brands.

Polyetherimides comprise more than 1, for example 2 to 1000, or 5 to 500, or 10 to 100 structural units of formula (1)

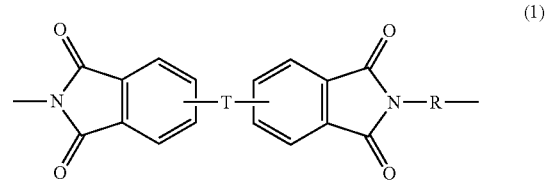

(1)

wherein each R is independently the same or different, and is a substituted or unsubstituted divalent organic group, such as a substituted or unsubstituted $C_{6-20}$ aromatic hydrocarbon group, a substituted or unsubstituted straight or branched chain $C_{4-20}$ alkylene group, a substituted or unsubstituted $C_{3-8}$ cycloalkylene group, in particular a halogenated derivative of any of the foregoing. In some embodiments R is divalent group of one or more of the following formulas (2)

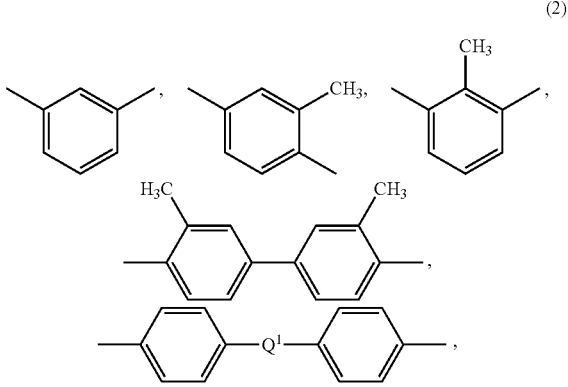

(2)

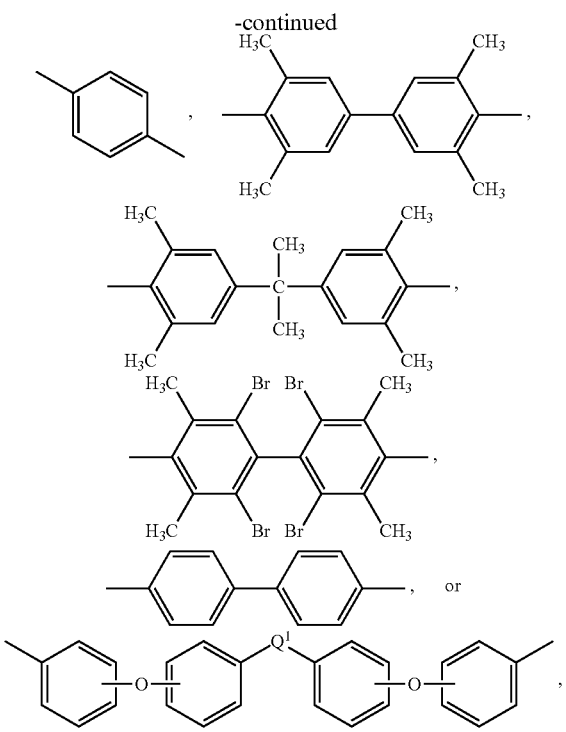

wherein $Q^1$ is —O—, —S—, —C(O)—, —SO$_2$—, —SO—, —P(R$^a$)(=O)— wherein R$^a$ is a C$_{1-8}$ alkyl or C$_{6-12}$ aryl, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In some embodiments R is m-phenylene, p-phenylene, or a diarylene sulfone, in particular bis(4,4'-phenylene)sulfone, bis(3,4'-phenylene)sulfone, bis(3,3'-phenylene)sulfone, or a combination comprising at least one of the foregoing. In some embodiments, at least 10 mole percent of the R groups contain sulfone groups, and in other embodiments no R groups contain sulfone groups.

Further in formula (1), T is —O— or a group of the formula —O—Z—O— wherein the divalent bonds of the —O—Z—O— group are in the 3,3', 3,4', 4,3', or the 4,4' positions, and Z is an aromatic C$_{6-24}$ monocyclic or polycyclic moiety optionally substituted with 1 to 6 C$_{1-8}$ alkyl groups, 1 to 8 halogen atoms, or a combination comprising at least one of the foregoing, provided that the valence of Z is not exceeded. Exemplary groups Z include groups of formula (3)

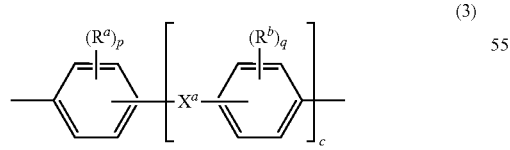

(3)

wherein R$^a$ and R$^b$ are each independently the same or different, and are a halogen atom or a monovalent C$_{1-6}$ alkyl group, for example; p and q are each independently integers of 0 to 4; c is 0 to 4; and X$^a$ is a bridging group connecting the hydroxy-substituted aromatic groups, where the bridging group and the hydroxy substituent of each C$_6$ arylene group are disposed ortho, meta, or para (specifically para) to each other on the C$_6$ arylene group. The bridging group X$^a$ can be a single bond, —O—, —S—, —S(O)—, —S(O)$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. A specific example of a group Z is a divalent group of formula (3a)

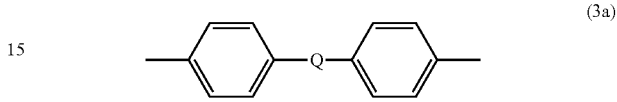

(3a)

wherein Q is —O—, —S—, —C(O)—, —SO$_2$—, —SO—, —P(R$^a$)(=O)— wherein R$^a$ is a C$_{1-8}$ alkyl or C$_{6-12}$ aryl, or —C$_y$H$_{2y}$— wherein y is an integer from 1 to 5 or a halogenated derivative thereof (including a perfluoroalkylene group). In a specific embodiment Z is a derived from bisphenol A, such that Q in formula (3a) is 2,2-isopropylidene.

In an embodiment in formula (1), R is m-phenylene, p-phenylene, or a combination comprising at least one of the foregoing, and T is —O—Z—O— wherein Z is a divalent group of formula (3a). Alternatively, R is m-phenylene, p-phenylene, or a combination comprising at least one of the foregoing, and T is —O—Z—O wherein Z is a divalent group of formula (3a) and Q is 2,2-isopropylidene. Alternatively, the polyetherimide can be a copolymer comprising additional structural polyetherimide units of formula (1) wherein at least 50 mole percent (mol %) of the R groups are bis(3,4'-phenylene)sulfone, bis(3,3'-phenylene)sulfone, or a combination comprising at least one of the foregoing and the remaining R groups are p-phenylene, m-phenylene or a combination comprising at least one of the foregoing; and Z is 2,2-(4-phenylene)isopropylidene, i.e., a bisphenol A moiety.

In some embodiments, the polyetherimide is a copolymer that optionally comprises additional structural imide units that are not polyetherimide units, for example imide units of formula (4)

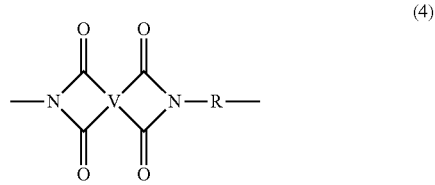

(4)

wherein R is as described in formula (1) and each V is the same or different, and is a substituted or unsubstituted C$_{6-20}$ aromatic hydrocarbon group, for example a tetravalent linker of the formulas

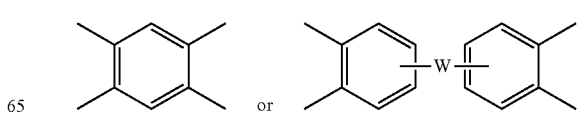

wherein W is a single bond, —O—, —S—, —C(O)—, —SO$_2$—, —SO—, —P(R$^a$)(=O)— wherein R$^a$ is a C$_{1-8}$ alkyl or C$_{6-12}$ aryl, or —C$_y$H$_{2y}$— wherein y is an integer from 1 to 5 or a halogenated derivative thereof (which includes perfluoroalkylene groups). These additional structural imide units preferably comprise less than 20 mol % of the total number of units, and more preferably can be present in amounts of 0 to 10 mol % of the total number of units, or 0 to 5 mol % of the total number of units, or 0 to 2 mole % of the total number of units. In some embodiments, no additional imide units are present in the polyetherimide.

The polyetherimide can be prepared by any of the methods known to those skilled in the art, including the reaction of an aromatic bis(ether anhydride) of formula (5) or a chemical equivalent thereof, with an organic diamine of formula (6)

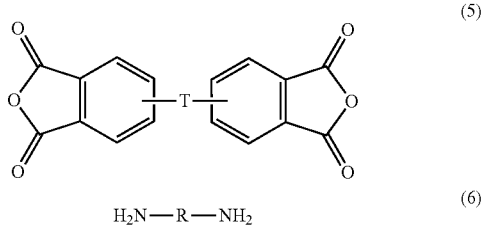

(5)

H$_2$N—R—NH$_2$ (6)

wherein T and R are defined as described above. Copolymers of the polyetherimides can be manufactured using a combination of an aromatic bis(ether anhydride) of formula (5) and an additional bis(anhydride) that is not a bis(ether anhydride), for example pyromellitic dianhydride or bis(3, 4-dicarboxyphenyl) sulfone dianhydride.

Illustrative examples of aromatic bis(ether anhydride)s include 2,2-bis[4-(3,4-dicarboxyphenoxy)phenyl]propane dianhydride (also known as bisphenol A dianhydride or BPADA), 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy) benzophenone dianhydride; 4,4'-bis(2,3-dicarboxyphenoxy) diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3, 4-dicarboxyphenoxy)diphenyl sulfide dianhydride; 4-(2,3-dicarboxyphenoxy)-4'-(3,4-dicarboxyphenoxy) benzophenone dianhydride; 4,4'-(hexafluoroisopropylidene) diphthalic anhydride; and 4-(2,3-dicarboxyphenoxy)-4'-(3, 4-dicarboxyphenoxy)diphenyl sulfone dianhydride. A combination of different aromatic bis(ether anhydride)s can be used.

Examples of organic diamines include 1,4-butane diamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2, 2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1, 3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. C$_{1-4}$ alkylated or poly(C$_{1-4}$)alkylated derivatives of any of the foregoing can be used, for example a polymethylated 1,6-hexanediamine. Combinations of these compounds can also be used. In some embodiments the organic diamine is m-phenylenediamine, p-phenylenediamine, 4,4'-diaminodiphenyl sulfone, 3,4'-diaminodiphenyl sulfone, 3,3'-diaminodiphenyl sulfone, or a combination comprising at least one of the foregoing.

The thermoplastic composition can also comprise a poly (siloxane-etherimide) copolymer comprising polyetherimide units of formula (1) and siloxane blocks of formula (7)

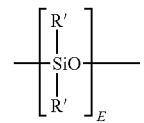

(7)

wherein E has an average value of 2 to 100, 2 to 31, 5 to 75, 5 to 60, 5 to 15, or 15 to 40, each R' is independently a C$_{1-13}$ monovalent hydrocarbyl group. For example, each R' can independently be a C$_{1-13}$ alkyl group, C$_{1-13}$ alkoxy group, C$_{2-13}$ alkenyl group, C$_{2-13}$ alkenyloxy group, C$_{3-6}$ cycloalkyl group, C$_{3-6}$ cycloalkoxy group, C$_{6-14}$ aryl group, C$_{6-10}$ aryloxy group, C$_{7-13}$ arylalkyl group, C$_{7-13}$ arylalkoxy group, C$_{7-13}$ alkylaryl group, or C$_{7-13}$ alkylaryloxy group. The foregoing groups can be fully or partially halogenated with fluorine, chlorine, bromine, or iodine, or a combination comprising at least one of the foregoing. In an embodiment no bromine or chlorine is present, and in another embodiment no halogens are present. Combinations of the foregoing R groups can be used in the same copolymer. In an embodiment, the polysiloxane blocks comprises R' groups that have minimal hydrocarbon content. In a specific embodiment, an R' group with a minimal hydrocarbon content is a methyl group.

The poly (siloxane-etherimide)s can be formed by polymerization of an aromatic bis(ether anhydride) of formula (5) and a diamine component comprising an organic diamine (6) as described above or a combination of diamines, and a polysiloxane diamine of formula (8)

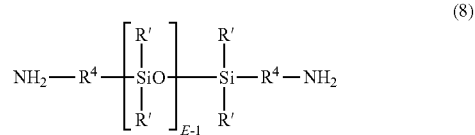

(8)

wherein R' and E are as described in formula (7), and R$^4$ is each independently a C$_2$-C$_{20}$ hydrocarbon, in particular a C$_2$-C$_{20}$ arylene, alkylene, or arylenealkylene group. In an embodiment $R^4$ is a $C_2$-$C_{20}$ alkylene group, specifically a $C_2$-$C_{10}$ alkylene group such as propylene, and E has an average value of 5 to 100, 5 to 75, 5 to 60, 5 to 15, or 15 to 40. Procedures for making the polysiloxane diamines of formula (8) are well known in the art.

In some poly(siloxane-etherimide)s the diamine component can contain 10 to 90 mole percent (mol %), or 20 to 50 mol %, or 25 to 40 mol % of polysiloxane diamine (8) and 10 to 90 mol %, or 50 to 80 mol %, or 60 to 75 mol % of diamine (6), for example as described in U.S. Pat. No. 4,404,350. The diamine components can be physically mixed prior to reaction with the bisanhydride(s), thus forming a substantially random copolymer. Alternatively, block or alternating copolymers can be formed by selective reaction of (6) and (8) with aromatic bis(ether anhydrides (5), to make polyimide blocks that are subsequently reacted together. Thus, the poly(siloxane-imide) copolymer can be a block, random, or graft copolymer. In an embodiment the copolymer is a block copolymer.

Examples of specific poly(siloxane-etherimide)s are described in U.S. Pat. Nos. 4,404,350, 4,808,686 and 4,690,997. In an embodiment, the poly(siloxane-etherimide) has units of formula (9)

disposed on at least a portion of a porous polyolefin substrate. Exemplary polyolefins include polyethylene, polypropylene, polybutylene, polypentene, polyhexene, polyoctene, a copolymer of one or more of ethylene, propylene, butene, pentene, 4-methylpentene, hexene and octane, or a mixture thereof. In an aspect, the porous polyolefin substrate has a porosity of 10 to 95% and a thickness of 5 μm to 50 μm, while the coating has a thickness of 5 μm to 50 μm. The porous polyolefin substrate can be a multilayer structure such as a polyethylene-polypropylene-polyethylene trilayer structure.

In an aspect, the separator 104 can be prepared by dissolving a polyetherimide in a solvent for the polyetherimide (e.g., a pyrrolidone solvent, a phenolic solvent, dimethylformamide or dimethylacetamide) at room temperature or elevated temperatures (e.g., 20 to 210° C.), followed by casting the solution at reduced temperature (e.g., 20-50° C., preferably 20 to 30° C.) on at least a portion of a porous polyolefin substrate to form a thin film coating disposed on at least a portion of the porous polyolefin substrate, and coagulating the thin film in a bath comprising a non-solvent for the polyetherimide, preferably water, and optionally a solvent for the polyetherimide to provide a porous

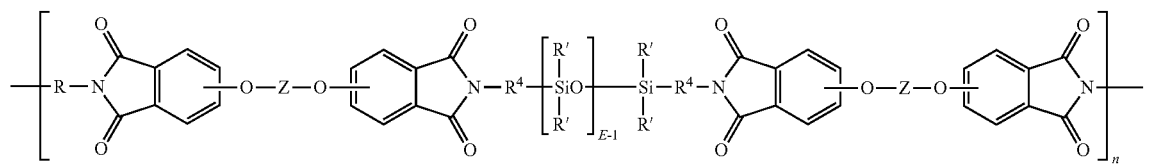

wherein R' and E of the siloxane are as in formula (7), R and Z of the imide are as in formula (1), $R^4$ is as in formula (8), and n is an integer from 5 to 100. In a specific embodiment of the poly(siloxane-etherimide), R of the etherimide is a phenylene, Z is a residue of bisphenol A, $R^4$ is n-propylene, E is 2 to 50, 5, to 30, or 10 to 40, n is 5 to 100, and each R' of the siloxane is methyl.

The relative amount of polysiloxane units and etherimide units in the poly(siloxane-etherimide) depends on the desired properties, and are selected using the guidelines provided herein. In particular, as mentioned above, the block or graft poly(siloxane-etherimide) copolymer is selected to have a certain average value of E, and is selected and used in amount effective to provide the desired wt % of polysiloxane units in the composition. In an embodiment the poly(siloxane-etherimide) comprises 10 to 50 wt %, 10 to 40 wt %, or 20 to 35 wt % polysiloxane units, based on the total weight of the poly(siloxane-etherimide).

The polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide has a weight average molecular weight (Mw) of 1,000 to 150,000 grams/mole (Dalton), as measured by gel permeation chromatography, using polystyrene standards. In some embodiments the polyetherimide has an Mw of 10,000 to 80,000 Daltons. Such polyetherimides typically have an intrinsic viscosity greater than 0.2 deciliters per gram (dl/g), or, more specifically, 0.35 to 0.7 dl/g as measured in m-cresol at 25° C.

In an aspect, the porous polyetherimide membrane is in the form of a multilayer separator. For example, the porous polyetherimide membrane can be in the form of a coating polyetherimide coating. The separator is then formed by contacting the porous polyetherimide coating with the electrolyte composition to fill at least a portion of the plurality of pores.

As an example, membranes can be prepared using the materials and processes disclosed herein for environments such as battery cells and/or capacitor cells, electrolytic energy storage devices, a dialysis membrane, a water filtration membrane, a desalination membrane, a gas separation membrane, and the like.

The disclosure and claims are further illustrated by the following Example.

EXAMPLE

Materials and Methods

Separators were produced by dissolving dried ULTEM polyetherimide in N-methyl pyrrolidone (NMP) to form a dope solution at room temperature or 200° C. After cooling the solution to room temperature, the viscous solution was cast on a glass plate using a K202 film coater (RK Printcoat) with a bird applicator of 75 micron gap thickness at a speed of 8 m/min. The glass plate with the cast, wet film was immediately placed into a coagulation bath (1.5-2.0 L) and left for 1 hour, after which time the formed separator was placed in pure water for 1 day and, after a final wash in methanol, the separators were dried for 1 hour at 200° C. under vacuum. Table 1 summarizes the preparation conditions and the corresponding sample coding for the various separators. While membranes 1 and 2 in Table 1 were selected for these studies, one or ordinary skill in the art would understand that the membrane properties, such as thickness, pore size, total porosity, Gurley, basis weight, and the like) can be tuned by varying the processing conditions, including applicator gap thickness, ULTEM concentration in dope solution, coagulation bath composition, and the like.

TABLE 1

Separator preparations and conditions

| Separator | ULTEM type | ULTEM in NMP dope concentration (wt %) | Dissolution temperature | Coagulation bath composition |
|---|---|---|---|---|
| ULTEM Membrane 1 | 1000* | 17 | Room Temperature | 25/75 $H_2O$/NMP |
| ULTEM Membrane 2 | 5001** | 14 | 200° C. | 25/75 $H_2O$/NMP |

*Polyetherimide based on bisphenol A (BPA) and 1,3-diamino-phenylene (mPD).
**Polyetherimide based on BPA and 1,4-diaminophenylene (pPD).

Table 2 describes the three ionic liquids tested, their chemical names and their thermal transitions. Although a very broad range of ionic liquids are available, the cation and anion combinations of these ionic liquids where selected as being relevant to lithium-ion battery electrolyte applications.

TABLE 2

Ionic liquids and their thermal transitions

| Type | Cation | Anion | Molar mass | Tg | Tm |
|---|---|---|---|---|---|
| PYR13-TFSI | N-Propyl-N-methylpyrrolidinium | Bis(trifluoromethanesulfonyl)imide | 408.4 | −91° C. | 6-12° C. |
| PYR14-FSI | 1-Butyl-1-methylpyrrolidinium | Bis(fluorosulfonyl)imide | 322.4 | −87° C. | −18° C. |
| BMI-TFSI | 1-Butyl-3-methylimidazolium | Bis(trifluoromethanesulfonyl) imide | 419.4 | | −4° C. |

FIG. 2 provides the structures of the ionic liquids.

The chemical compatibility of the separators against the ionic liquids was tested by placing 3-5 mg ("initial mass") of separator in the ionic liquid at 55° C. The elevated temperature of 55° C. was used to accelerate any potential incompatibility effects, such as dissolution of the separator in the ionic liquid. After 7 days, the separators were taken out of the ionic liquids and were dried at 60° C. The dried separators were soaked in ethanol to dissolve any potential residual ionic liquid, and were subsequently dried again, and weighed ("dried mass"). The weight of the original separator and the separator sample after the above procedure was compared, and the "normalized dry weight" was calculated as 100%*(("dried mass"−"initial mass")/("initial mass")).

Results

Table 3 provides the physical properties of the three tested membranes, including thickness, Gurley (air permeability) and basis weight. Celgard® 2500 was used as the reference separator.

Air permeability measurements (Gurley densometer, JIPS 8117 (2009)—Determination of air permeance and air resistance (medium large)—Gurley Method) were performed. Air permeability is measured in Gurley seconds and is generally accepted to be linked to the resistance of the separator in an electrochemical cell environment. Higher Gurley values indicate a lower air transport through the membrane, which typically translate into a lower ionic conductivity in an electrochemical cell environment.

TABLE 3

Separator physical properties

| Separator | Thickness (micron) | Gurley (s/100 cc-20 Oz) | Basis weight (g/m$^2$) |
|---|---|---|---|
| Celgard ® 2500 | 25 | 214 | 10.2 |
| ULTEM Membrane 1 | 25 | 150 | 9.9 |
| ULTEM Membrane 2 | 22 | 40 | 8.4 |

Table 4 provides the "normalized dry weight" (or in other words, the weight loss) of the separators measured in the 3 different ionic liquids after 7 days at 55° C. The data clearly shows that all three separators are chemically resistant against all three ionic liquids, as no significant dissolution is observed (<1%).

TABLE 4

Measured "dry weight" of 3 separators measured in 3 ionic liquids

| Separator | PYR13-TFSI | PYR14-FSI | BMI-TFSI |
|---|---|---|---|
| Celgard ® 2500 | −0.6% | −0.6% | −0.4% |
| ULTEM Membrane 1 | −0.2% | −0.7% | −0.2% |
| ULTEM Membrane 2 | −0.3% | 0.5% | −0.5% |

Figure 3:
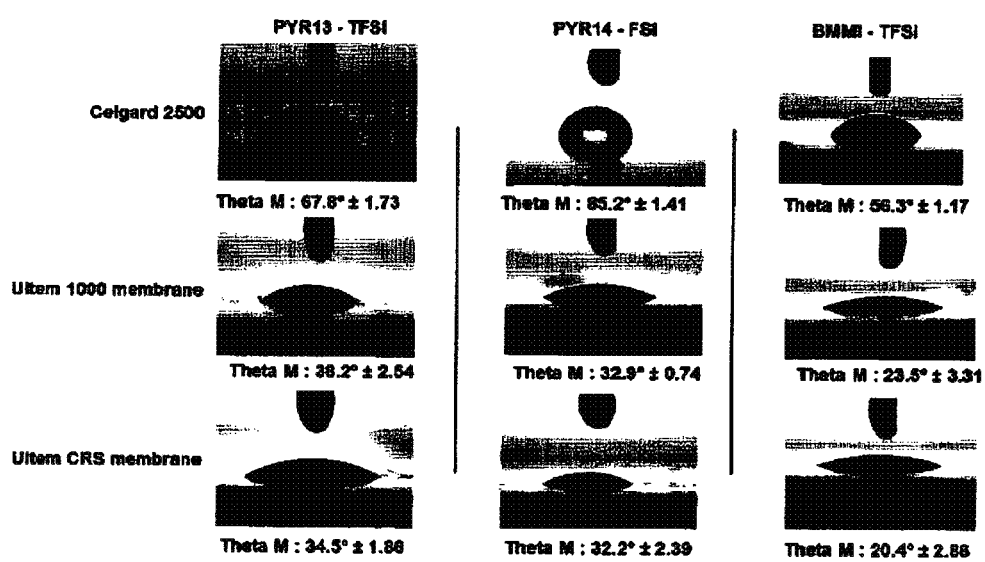
FIG. 3 shows the wettability of the separators with the ionic liquids determined using contact angle measurements.

The wettability of the separators with the ionic liquids was determined using contact angle measurements, of which the results are show below in FIG. 3 and Table 5. Contact angle was measured according to a standard procedure (e.g., via the Young equation or similar), where a mathematical expression was fitted to the shape of the drop and the slope of the tangent to the drop at the liquid-solid-vapor (LSV) interface line was calculated. Each sample was measured at least five times and the contact angle was recorded 5 seconds after dispensing the droplet onto the surface, unless stated otherwise. The contact angle values (Theta M) show the mean value and standard deviation of 5 repeat measurements.

TABLE 5

Contact angle of 3 separators measured with 3 ionic liquids

| Separator | PYR13-TFSI | PYR14-FSI | BMI-TFSI |
|---|---|---|---|
| Celgard ® 2500 | 67.8 | 85.2 | 56.3 |
| ULTEM Membrane 1 | 38.2 | 32.9 | 23.5 |
| ULTEM Membrane 2 | 34.5 | 32.2 | 20.4 |

The data very clearly demonstrate a poor wetting of the Celgard® 2500 reference separator with all ionic liquids, demonstrated by high contacts angles, ranging from 56.3 to 85.2°. For PYR14-FSI, the contact angle is even as high as 85.2°, and the image clearly shows a droplet being formed on the surface of the Celgard® 2500 separator. On the contrary, the ULTEM membranes show an excellent wetting with the ionic liquid, with contact angles as low as 20.4°. At such low contact angles, a clear droplet on the separator surface can no longer be detected, as the ionic liquid immediately wets out the surface of the separator.

This disclosure further encompasses the following non-limiting embodiments.

Embodiment 1

A separator 104, comprising a porous polyetherimide membrane comprising a plurality of pores, wherein at least a portion of the pores comprise an electrolyte composition comprising an ionic liquid.

Embodiment 2

The separator of embodiment 1, wherein the separator has one or more of the following properties: an ionic liquid contact angle of less than or equal to 50°, preferably less than or equal to 30°; a thickness of about 5 micrometers to about 200 micrometers, preferably about 10 micrometers to about 30 micrometers; a basis weight of 2 to 40 g/m², preferably 5 to 15 g/m; a porosity of 10% to 90%, preferably 35% to 60%; an average pore size is 2 nm to 2000 nm, preferably 10 nm to 200 nm; a Gurley air permeability of 10 to 1000 s/100 cc, preferably 20 to 500 s/100 cc; a dimensional stability of >120° C., preferably >180° C.; or a normalized dry weight of greater than or equal to 90% after 7 days at 55° C. in the ionic liquid.

Embodiment 3

The separator of any one or more of embodiments 1 and 2, wherein the polyetherimide comprises repeating units of formula (1) wherein each R is independently a substituted or unsubstituted $C_{6-20}$ aromatic hydrocarbon group, a substituted or unsubstituted, straight or branched chain $C_{4-20}$ alkylene group, a substituted or unsubstituted $C_{3-8}$ cycloalkylene group, or a combination comprising at least one of the foregoing; and each Z is independently an aromatic $C_{6-24}$ monocyclic or polycyclic group optionally substituted with 1 to 6 $C_{1-8}$ alkyl groups, 1 to 8 halogen atoms, or a combination comprising at least one of the foregoing.

Embodiment 4

The separator of embodiment 3, wherein R is a divalent group of the formulas (2) wherein $Q^1$ is —O—, —S—, —C(O)—, —SO$_2$—, —SO—, —P(R$^a$)(=O)— wherein R$^a$ is a $C_{1-8}$ alkyl or $C_{6-12}$ aryl, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4; and Z is a group derived from a dihydroxy compound of the formula (3) wherein R$^a$ and R$^b$ are each independently a halogen atom or a monovalent $C_{1-6}$ alkyl group; p and q are each independently integers of 0 to 4; c is 0 to 4; and X$^a$ is a single bond, —O—, —S—, —S(O)—, —SO$_2$—, —C(O)—, or a $C_{1-18}$ organic bridging group.

Embodiment 5

The separator of any one or more of embodiments 3 and 4, wherein each R is independently meta-phenylene, para-phenylene, bis(4,4'-phenylene)sulfone, bis(3,4'-phenylene)sulfone, bis(3,3'-phenylene)sulfone, or a combination comprising at least one of the foregoing, and each Z is 4,4'-diphenylene isopropylidene.

Embodiment 6

The separator of embodiment 5, wherein at least 50 mole percent of the R groups are bis(3,4'-phenylene)sulfone, bis(3,3'-phenylene)sulfone, or a combination comprising at least one of the foregoing.

Embodiment 7

The separator of any one or more of embodiments 1 to 6, wherein the polyetherimide further comprises siloxane blocks of formula (7) wherein E has an average value of 2 to 100, and each R' is independently a $C_{1-13}$ monovalent hydrocarbyl group, preferably wherein the poly(siloxane-etherimide) has units of formula (9) wherein E has an average value of 2 to 100, each R' is independently a methyl group, $R^4$ is a $C_2$-$C_{20}$ alkylene group, and n is an integer from 5 to 100.

Embodiment 8

The separator of any one or more of embodiments 1 to 7, wherein the ionic liquid comprises an imidazolium cation, an isoquinolinium cation, a sulfonium cation, an ammonium cation, a pyridinium cation, a phosphonium cation, a pyrrazolium cation, a pyrrolidinium cation, a piperidinium cation, a dicationic species, or a combination comprising at least one of the foregoing; and a bis(fluorosulfonyl)imide anion, a bis(trifluoromethane)sulfonimide anion, a bis(pentafluoroethylsulfonyl)amide anion, a (fluorosulfonyl)(trifluoromethylsulfonyl)amide anion, a tetrafluoroborate anion, a hexafluorophosphate anion, a bis(fluorosulfonyl)imide anion; a bis(perfluoroethylsulfonyl)imide anion, a bis(trifluoromethanesulfonyl)imide anion, a triflate anion, a tetrachloroaluminate anion, 2,2,2-trifluoro-N-(trifluoromethylsulfonyl)acetamide, aluminum chloride, Cl$^-$, F$^-$, S$^{2-}$, or a combination comprising at least one of the foregoing.

Embodiment 9

The separator of any one or more of embodiments 1 to 8, wherein the electrolyte further comprises a lithium salt.

Embodiment 10

The separator of any one or more of embodiments 1 to 9, wherein the separator 104 comprises a multilayer structure.

Embodiment 11

The separator of embodiment 10, wherein the porous polyetherimide membrane is in the form of a coating disposed on at least a portion of a porous substrate, preferably a porous polyolefin substrate.

Embodiment 12

A method of preparing the separator 104 of any one or more of embodiments 1 to 9, comprising: dissolving a polyetherimide in a solvent at room temperature to 210° C., preferably 30-200° C., to form a solution, casting the solution at a temperature of 20-50° C., preferably 20-30° C. to form a thin film, coagulating the thin film in a coagulating bath comprising a nonsolvent for the polyetherimide, preferably water, and optionally a solvent for the polyetherimide to provide the porous polyetherimide membrane, and contacting the porous polyetherimide membrane with the electrolyte composition to fill at least a portion of the plurality of pores to provide the separator.

Embodiment 13

The method of embodiment 12, wherein casting the solution at a temperature of 20-50° C., preferably 20-30° C. to form the thin film comprises casting the solution on at least a portion of a porous polyolefin substrate to provide a coating on the porous polyolefin substrate.

Embodiment 14

The method of any one or more of embodiments 12 and 13, wherein the solvent is 2-pyrrolidone, 1-ethyl-2-pyrrolidone, 1-cyclohexyl-2-pyrrolidone, 1-(2-hydroxyethyl)-2-pyrrolidone, 1-octyl-2-pyrrolidone, 1-N-ethoxycarbonyl-3-pyrrolidone, N-methyl-2-pyrrolidone, 1-vinyl-2-pyrrolidone, dimethylformamide, dimethylacetamide or a combination comprising at least one of the foregoing.

Embodiment 15

The method of any one or more of embodiments 12 and 13, wherein the solvent is of 4-chloro-3-methyl-phenol, 4-chloro-2-methyl-phenol, 2,4-dichloro-6-methyl-phenol, 2,4-dichloro-phenol, 2,6-dichloro-phenol, 4-chloro-phenol, 2-chloro-phenol, o-cresol, m-cresol, p-cresol, 4-methoxy-phenol, catechol, benzoquinone, 2,3-xylenol, 2,6-xylenol, resorcinol, or a combination comprising at least one of the foregoing.

Embodiment 16

A system comprising: an anode 102, a cathode 100, the separator 104 of any one or more of embodiments 1 to 11 disposed between the anode 102 and the cathode 100, and the electrolyte comprising the ionic liquid 108 in contact with the anode 102, the cathode 100, and the separator 104.

Embodiment 17

The system of embodiment 16, in the form of an electrochemical cell.

Embodiment 18

The system of embodiment 17, wherein the electrochemical cell is a lithium-ion battery.

The assemblies, methods, and devices can alternatively comprise, consist of, or consist essentially of, any appropriate components or steps herein disclosed. The assemblies, methods, and devices can additionally, or alternatively, be formulated so as to be devoid, or substantially free, of any steps, components, materials, ingredients, adjuvants, or species that are otherwise not necessary to the achievement of the function or objectives of the assemblies, methods, and devices. All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "an embodiment" means that a particular element described in connection with the embodiment is included in at least some embodiments described herein, and may or may not be present in other embodiments. In addition, the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A separator 104, comprising
a porous polyetherimide membrane comprising a plurality of pores,
wherein at least a portion of the pores comprise an electrolyte composition comprising an ionic liquid;
wherein the ionic liquid is in a liquid state at a temperature of below 100° C.

2. The separator of claim 1, wherein the separator has one or more of the following properties:
an ionic liquid contact angle of less than or equal to 50°;
a thickness of 5 micrometers to 200 micrometers;
a basis weight of 2 to 40 g/m$^2$;
a porosity of 10% to 90%;
an average pore size is 2 nm to 2000 nm;
a Gurley air permeability of 10 to 1000 s/100 cc;
a dimensional stability of >120° C.; or
a normalized dry weight of greater than or equal to 90% after 7 days at 55° C. in the ionic liquid.

3. The separator of claim 1, wherein the polyetherimide comprises repeating units of the formula

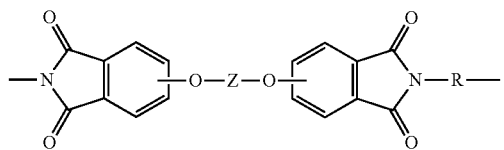

wherein
each R is independently a substituted or unsubstituted $C_{6-20}$ aromatic hydrocarbon group, a substituted or unsubstituted, straight or branched chain $C_{4-20}$ alkylene group, a substituted or unsubstituted $C_{3-8}$ cycloalkylene group, or a combination comprising at least one of the foregoing; and each Z is independently an aromatic $C_{6-24}$ monocyclic or polycyclic group optionally substituted with 1 to 6 $C_{1-8}$ alkyl groups, 1 to 8 halogen atoms, or a combination comprising at least one of the foregoing.

4. The separator of claim 3, wherein
R is a divalent group of the formula

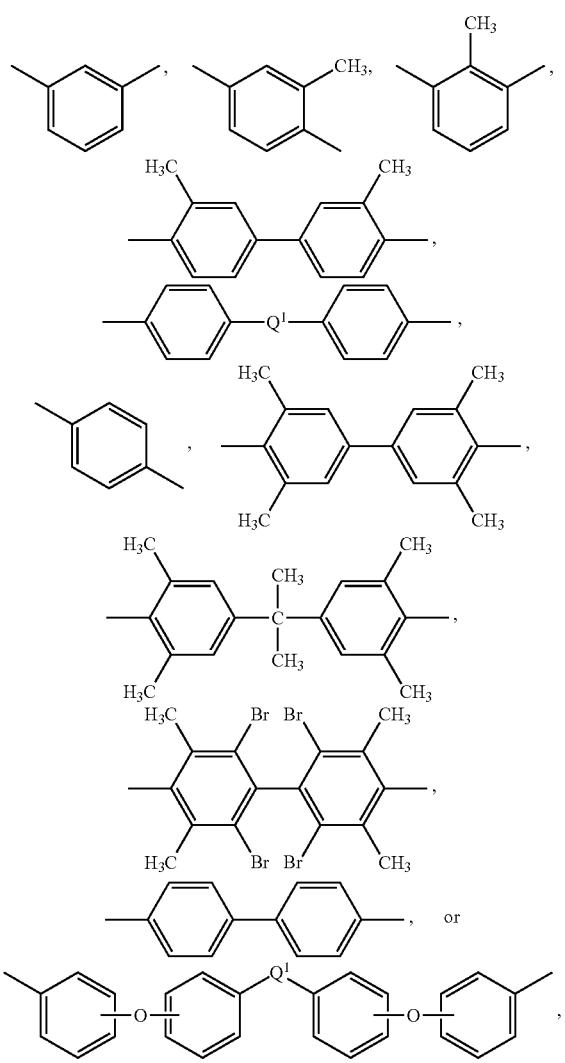

wherein $Q^1$ is —O—, —S—, —C(O)—, —SO$_2$—, —SO—, —P(R$^a$)(=O)— wherein R$^a$ is a $C_{1-8}$ alkyl or $C_{6-12}$ aryl, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4; and Z is a group derived from a dihydroxy compound of the formula (3)

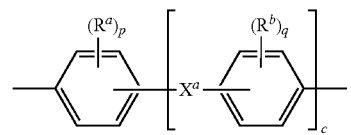

wherein
R$^a$ and R$^b$ are each independently a halogen atom or a monovalent $C_{1-6}$ alkyl group;
p and q are each independently integers of 0 to 4;
c is 0 to 4; and
X$^a$ is a single bond, —O—, —S—, —S(O)—, —SO$_2$—, —C(O)—, or a $C_{1-18}$ organic bridging group.

5. The separator of claim 3, wherein each R is independently meta-phenylene, para-phenylene, bis(4,4'-phenylene) sulfone, bis(3,4'-phenylene)sulfone, bis(3,3'-phenylene) sulfone, or a combination comprising at least one of the foregoing, and each Z is 4,4'-diphenylene isopropylidene.

6. The separator of claim 5, wherein at least 50 mole percent of the R groups are bis(3,4'-phenylene)sulfone, bis(3,3'-phenylene)sulfone, or a combination comprising at least one of the foregoing.

7. The separator of claim 3, wherein each R is meta-phenylene, bis(4,4'-phenylene)sulfone, bis(3,4'-phenylene) sulfone, bis(3,3'-phenylene)sulfone, or a combination comprising at least one of the foregoing.

8. The separator of claim 1, wherein the polyetherimide further comprises siloxane blocks of the formula

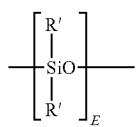

wherein E has an average value of 2 to 100, and each R' is independently a $C_{1-13}$ monovalent hydrocarbyl group,
preferably wherein the poly(siloxane-etherimide) has units of the formula

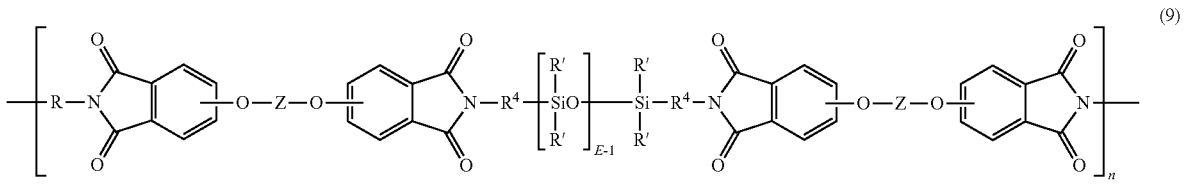

(9)

wherein
E has an average value of 2 to 100,
each R' is independently a methyl group,
$R^4$ is a $C_2$-$C_{20}$ alkylene group, and
n is an integer from 5 to 100.

9. The separator of claim 1, wherein the ionic liquid comprises
an imidazolium cation, an isoquinolinium cation, a sulfonium cation, an ammonium cation, a pyridinium cation, a phosphonium cation, a pyrrazolium cation, a pyrrolidinium cation, a piperidinium cation, a dicationic species, or a combination comprising at least one of the foregoing; and
a bis(fluorosulfonyl)imide anion, a bis(trifluoromethane) sulfonimide anion, a bis(pentafluoroethylsulfonyl)amide anion, a (fluorosulfonyl)(trifluoromethylsulfonyl) amide anion, a tetrafluoroborate anion, a hexafluorophosphate anion, a bis(fluorosulfonyl)imide anion; a bis(perfluoroethylsulfonyl)imide anion, a bis(trifluoromethanesulfonyl)imide anion, a triflate anion, a tetrachloroaluminate anion, 2,2,2-trifluoro-N-(trifluoromethylsulfonyl)acetamide, aluminum chloride, $Cl^-$, $F^-$, $S^{2-}$, or a combination comprising at least one of the foregoing.

10. The separator of claim 1, wherein the electrolyte further comprises a lithium salt.

11. The separator of claim 1, wherein the separator 104 comprises a multilayer structure.

12. The separator of claim 11, wherein the porous polyetherimide membrane is in the form of a coating disposed on at least a portion of a porous substrate.

13. A method of preparing the separator 104 of claim 1, comprising
dissolving a polyetherimide in a solvent at room temperature to 210° C., to form a solution,
casting the solution at a temperature of 20 to 50° C. to form a thin film,
coagulating the thin film in a coagulating bath comprising a nonsolvent for the polyetherimide, and optionally a solvent for the polyetherimide to provide the porous polyetherimide membrane, and
contacting the porous polyetherimide membrane with the electrolyte composition to fill at least a portion of the plurality of pores to provide the separator.

14. The method of claim 13, wherein casting the solution at a temperature of 20 to 50° C. to form the thin film comprises casting the solution on at least a portion of a porous polyolefin substrate to provide a coating on the porous polyolefin substrate.

15. The method of claim 13, wherein the solvent is 2-pyrrolidone, 1-ethyl-2-pyrrolidone, 1-cyclohexyl-2-pyrrolidone, 1-(2-hydroxyethyl)-2-pyrrolidone, 1-octyl-2-pyrrolidone, 1-N-ethoxycarbonyl-3-pyrrolidone, N-methyl-2-pyrrolidone, 1-vinyl-2-pyrrolidone, dimethylformamide, dimethylacetamide or a combination comprising at least one of the foregoing.

16. The method of claim 13, wherein the solvent is 4-chloro-3-methyl-phenol, 4-chloro-2-methyl-phenol, 2,4-dichloro-6-methyl-phenol, 2,4-dichloro-phenol, 2,6-dichloro-phenol, 4-chloro-phenol, 2-chloro-phenol, o-cresol, m-cresol, p-cresol, 4-methoxy-phenol, catechol, benzoquinone, 2,3-xylenol, 2,6-xylenol, resorcinol, or a combination comprising at least one of the foregoing.

17. A system comprising
an anode 102,
a cathode 100,
the separator 104 of claim 1 disposed between the anode 102 and the cathode 100, and
the electrolyte comprising the ionic liquid 108 in contact with the anode 102, the cathode 100, and the separator 104.

18. The system of claim 17, in the form of an electrochemical cell.

19. The system of claim 18, wherein the electrochemical cell is a lithium-ion battery.

* * * * *